United States Patent [19]

Williams et al.

[11] Patent Number: 5,002,673

[45] Date of Patent: Mar. 26, 1991

[54] CORROSION INHIBITOR AND METHOD OF USE

[75] Inventors: Dennis A. Williams; Phyllis K. Holifield; James R. Looney; Lee A. McDougall, all of Houston, Tex.

[73] Assignee: Exxon Chemical Patents Inc., Linden, N.J.

[21] Appl. No.: 332,629

[22] Filed: Mar. 31, 1989

[51] Int. Cl.$^5$ .......................... E21B 43/27; C11D 7/48; C23F 11/16

[52] U.S. Cl. .............................. 252/8.555; 252/8.551; 252/8.552; 252/8.553

[58] Field of Search ............... 252/8.551, 8.552, 8.553, 252/8.554

[56] References Cited

U.S. PATENT DOCUMENTS

| | | | |
|---|---|---|---|
| 3,773,465 | 11/1973 | Keeney et al. | 422/12 X |
| 3,779,935 | 12/1973 | McDougall | 252/149 |
| 4,028,268 | 6/1977 | Sullivan et al. | 252/392 |
| 4,444,668 | 4/1984 | Walker et al. | 252/8.551 |
| 4,498,994 | 2/1985 | Heilweil | 252/8.514 |
| 4,498,997 | 2/1985 | Walker | 252/8.553 |
| 4,522,658 | 6/1985 | Walker | 148/248 |
| 4,541,946 | 9/1985 | Jones et al. | 252/189 |
| 4,552,672 | 12/1985 | Walker | 252/8.553 |

OTHER PUBLICATIONS

H751, Statutory Invention Registration Publication, Sullivan et al., Mar. 1990.

*Primary Examiner*—Robert L. Stoll
*Assistant Examiner*—Chhaya Sayala
*Attorney, Agent, or Firm*—R. L. Graham

[57] ABSTRACT

A corrosion inhibitor formulation for use in well treatig acids includes a highly polar aprotic solvent having dissolved therein (a) a complex of a metal compound and a quaternary ammonium compound and (b) a dispersant capable of dispersing the complex in the well treating acid solution.

20 Claims, No Drawings

CORROSION INHIBITOR AND METHOD OF USE

BACKGROUND OF THE INVENTION

This invention relates generally to corrosion inhibitors and more specifically to corrosion inhibitors containing metal salts for use in acid solutions used in acid treatment of subterranean formations.

DESCRIPTION OF THE PRIOR ART

Acids and acid solutions have long bee used in the stimulation of oil wells, gas wells, water wells, and similar boreholes. Acid stimulation is performed in wells completed in subterranean formations. Acidizing is used in conjunction with hydraulic fracturing techniques and matrix acidizing techniques. In both acid fracturing and matrix acidizing, the well treating acid solutions, usually HCl, HF, or mixtures thereof, are pumped through the well tubular goods and injected into the formation where the acid attacks formation materials increasing its permeability to oil and/or gas.

In order to protect the equipment and tubular goods from the corrosive effects of the acid, the well treating acid almost always includes a corrosion inhibitor.

Corrosion inhibitors of diverse description and composition have been proposed over the years for use with well treating acids. Corrosion inhibitors that have received wide spread use are those containing metal/quaternary ammonium complexes. Some of these are described in the following U.S. Pat. Nos.: 3,773,465 (cuprous iodide); 4,498,997; 4,522,658; and 4,552,672 (antimony compounds).

In the past, the metal/quaternary complexes, have been used with an acetylenic compound which apparently contributes to the effectiveness of the complex, particularly at high temperatures. Corrosion inhibitors containing acetylenic compounds, quaternary ammonium compounds and metal salts such as antimony chloride or cuprous iodide present two serious problems: (1) the acetylenic compound is highly toxic and (2) the complex is difficult to disperse in the acid. The toxicity problem can be overcome by eliminating the acetylenic compound The dispersion problem normally required the separate addition to the acid of the corrosion inhibitor formulation (with the acetylenic compound and the quaternary compound) and the antimony compound at the well site during, or immediately prior to, pumping operations.

Efforts to solve these two problems have not been satisfactory.

SUMMARY OF THE INVENTION

A corrosion inhibitor formulation of the present invention comprises four essential components:

(a) a metal compound, preferably antimony, bismuth, calcium, and cuprous salts, (b) an ammonium quaternary compound capable of forming a complex with the metal compound, (c) a highly polar aprotic solvent, and (d) an organic amine dispersant In a preferred embodiment, the formulation will also include a nonionionic surfactant (or surfactant blend) having an HLB No. of between 8 and 18.

A particularly advantageous feature of the corrosion inhibitor formulated in accordance with the present invention is that it exhibits excellent dispersion and stability properties, permitting the package to be preformulated and transported to the well site ready for use.

While the levels of the various components may vary within relatively wide ranges, depending on the degree of concentration desired, the following presents the broad, preferred, and most preferred ranges based on the weight of the corrosion inhibitor formulation.

|  | BROAD RANGE (wt %) | PREFERRED RANGE (wt %) | MOST PREFERRED RANGE (wt %) |
|---|---|---|---|
| Metal Compound | 1 to 25 | 2 to 20 | 4 to 10 |
| Quaternary Compound | 3 to 50 | 12 to 50 | 16 to 25 |
| Polar Solvent | 20 to 90 | 20 to 70 | 40 to 60 |
| Dispersant | 1 to 15 | 1 to 10 | 2 to 5 |
| Surfactant | 0 to 25 | 1 to 10 | 3 to 6 |

Generally, the component ranges are interchangeable. For example, the most preferred range of a metal component of the formulation may be used with both the broad and preferred ranges of the other components.

The corrosion inhibitor formulation is introduced into the well treating acid at a concentration sufficient to coat the well tubulars and equipment. The concentration of the formulation in the acid solution should generally be sufficient to provide the acid solution with at least 0.08 wt % of the metal compound. The upper limit of the metal compound in the acid solution will be controlled by economies but levels of about 1.5, preferably 1.0, wt %, will be satisfactory for most cases. Generally speaking, this corresponds to about 0.2 to 20 wt % of the formulation in the acid solution (based on the combined weight of the acid solution and corrosion inhibitor formulation).

The method of the present invention may employ the formulation described above in the acidizing of wells or the complexing components (i.e. the metal and quaternary compounds), may be used without the other components and introduced directly into the acid solution.

The corrosion inhibitor of the present invention provides effective corrosion protection associated with metal salt complexes, has low toxicity, and exhibits good stability.

DESCRIPTION OF PREFERRED EMBODIMENTS

As indicated above the corrosion inhibitor composition comprises four principal compounds. Each of these compounds as well as the acid solution in which they are used are described below.

Aqueous Acid Solutions: Any of the known oil field acids may be used. These are referred to herein as "well treating acids" and include aqueous solutions of hydrochloric acid (HCl), hydrofluoric acid (HF), mixtures of HCl and HF (i.e. mud acid), acetic acid, formic acid, and other organic acids and anhydrides. The most common acids are 3% HCl, 7½% HCl, 15% HCl, 28% HCl and blends of HCl and HF (mud acid). Mud acid is normally a blend of 6 to 12% of HCl and 1½ to 6% HF.

Metal Compounds: The function of the metal compound is to complex with the quaternary ammonium compound and form a protective deposit on the metal tubulars and equipment. A wide range of metal salts are useable for this purpose including, salts of Group IIA metals (atomic No. 12 to 56), Group IVA metals (atomic no. 22 and 40), Group IIB metals (atomic no. 13 to 49), Group VB metals (atomic no. 32 to 83), based on IUPAC Periodic Table notation.

Tests have shown that salts of the following metals and mixtures thereof exhibit corrosion protection when complexed with a quaternary ammonium compound or compounds:

| Most preferred: | Preferred: |
|---|---|
| Sb | Al |
| Bi | As |
| Ca | Ba |
| Cu+ (cuprous) | Sn |
| | Zr |
| | Mg |
| | Mo |
| | Sr |
| | Zn |

The metal salts or mixtures must be soluble in the solvent and form a soluble complex with the quaternary ammonium compound. The term "complex" as used herein means a coordination or association of the metal compound with the quaternary compound.

The metal salts are preferably metal halides, specifically metal chlorides. Some of the salts may be formed in situ, in which case the formulation will include an acid. For example, antimony chloride is produced from $Sb_2O_3$ and aqueous acid such as HCl. The insoluble $Sb_2O_3$ is converted to soluble salt.

As indicated above the antimony compound is among the most preferred. This antimony compound may comprise, for example, antimony trichloride, antimony pentachloride, antimony trifluoride, alkali metal salts of antimony tartrate, antimony adducts of ethylene glycol, and antimony trioxide or any other trivalent or pentavalent antimony compound and the like. As mentioned above, the antimony oxides may be converted to halide salts in the presence of aqueous acid.

The cuprous compound may be cuprous iodide as described in U.S. Pat. No. 3,773,465, the disclosure of which is incorporated herein by reference.

The binary and ternary metal mixtures are preferred for particularly severe corrosive environments since they appear to combine synergistically to provide protection. The binary metal salts may be mixed on weight ratios of 1:10 to 10:1. Each metal compound of the ternary mixture preferably should be present at a weight ratio of at least one part (preferably 2 parts) per 10 parts of each of the other two compounds.

The preferred metal mixtures and the mixture ratios are listed below.

| Sb/Ca | 1:1 to 1:10 |
|---|---|
| Sb/Cu+ | 1:1 to 10:1 |
| Ca/Cu+ | 1:5 to 10:1 |

The bismuth compound may be bismuth trichloride, bismuth triiodide, bismuth trioxide, alkali metal salts of bismuth tartrate, organic acid salts of bismuth such as bismuth subsalicylate or any other bismuth compound and the like. The bismuth trioxide may be converted to the halide salts in the presence of aqueous acid.

Quaternary Compounds: The quaternary ammonium compounds (referred to as "quaternary" herein) employed in the present invention must be capable of complexing with the selected metal salt. The preferred quaternary comprise aromatic nitrogen compounds which may be illustrated by alkyl pyridine-N-methyl chloride quaternary, alkyl pyridine-N-benzyl chloride quaternary, quinoline-N-methyl chloride quaternary, quinoline-N-benzyl chloride quaternary, quinoline-N-(chloro-benzyl chloride) quaternary, isoquinoline quaternaries, benzoquinoline quaternaries, chloromethyl napthalene quaternaries and admixtures of such compounds, and the like. The quaternary compound and metal salt may be used in molar ratios of 1:1 to 5:1. Generally, the quaternary compound, because of its higher molecular weight, will be present in the formulation at a higher concentration than the metal compound. The weight ratios of the quaternary compound and the metal compound preferably range from 1:1 to 4:1.

Solvent: The solvent must be a highly polar aprotic solvent, such as dimethyl formamide (DMF), dimethylsulfoxide (DMSO), dimethylacetamide (DMA), 1-methyl-2-pyrrolidone ("pyrrolidone"), tetramethylene sulfone ("sulfolane") and mixtures thereof. In these solvents, the ions of the metal salt are unencumbered permitting the complex to form. The aprotic solvent (e.g. DMF, DMSO, DMA, pyrrolidone, and sulfolane) may be blended with alcohol.

The preferred solvent is DMF or blends of alcohol and dimethyl formamide. Examples of such solvents include dimethyl formamide (DMF), DMF/isopropyl alcohol, DMF/methyl alcohol, DMF/formamide, DMF/formamide isopropyl alcohol, and DMF/formamide/ methyl alcohol. DMF preferably constitutes from 50 to 100 wt % of the above solvent blends.

The Dispersant: In order to disperse the quaternary/metal complex in aqueous acid, it has been found necessary to employ an organic amine (including aromatic amines, aliphatic amines, and heterocyclic amines) dispersant. The preferred dispersants are aminophenol, aniline, chloroaniline, toluidine, diphenyl amine, picoline, alkyl pyridine, or n-octylamine.

The Surfactant: The surfactant serves to wet the tubular goods to permit deposition of the quaternary/metal complex. The preferred surfactants are the nonionics having hydrophilic-lipophilic balance (HLB) numbers of 8 to 18, preferably 9 to 16 such as laurates, stearates, and oleates. Nonionic surfactants include the polyoxyethylene surfactants, (such as ethoxylated alkyl phenols, ethoxylated aliphatic alcohols), polyethylene glycol esters of fatty, resin, and tall oil acids. Examples of such surfactants are polyoxyethylene alkyl phenol wherein the alkyl group is linear or branched $C_8$–$C_{12}$ and contains above about 60 wt % poly oxyethylene. Octyl and nonyl phenols containing 9 to 15 moles ethyolene oxide per mole hydrophobe are the preferred ethoxylated alkyl phenol surfactants.

The polyoxyethylene ester of fatty acids include the mono and dioleates and sesquioleates wherein the molecular wt of the esterified polyethylene glycol is between about 200 and 1000.

Polyoxyethylene sorbitan oleates are also useable.

In practice, the nonionics may be blended to provide the desired properties. A particularly useful surfactant is a blend of polyethylene glycol esters of fatty acids and ethoxylated alkylphenols.

Preparation of the Formulation: The compounds can be mixed in the solvent in any order or the quaternary compound and metal salt can be added to the solvent and complexed prior to introduction of the dispersant and surfactant.

The quaternary compound and metal compound, (e.g. SbCl$_3$) are added in mole ratios of between 1:1 to 5:1 quaternary compound: metal compound.

The formulation of the present invention may be prepared as follows:

(a) Blend required amount of DMF and Quaternary compound.

(b) Add metal compound and mix until all material is dissolved. If metal oxide was used (Sb$_2$O$_3$ for example), add required amount of aqueous acid prior to metal compound. If required, the mixture may be heated to help dissolve the metal compound.

(c) The surfactant (if used) is blended in to the mixture when all the metal compound is dissolved.

(d) The dispersant is added and the resultant mixture stirred until a uniform blend is achieved.

Alternatively, the quaternary compound(s) and metal compound(s) can be introduced into the solvent and complexed in one step.

Operation: In operation, the formulation comprising the four principal components (preferably with the surfactant) may be premixed, prepackaged, and transported to the well site ready for use.

The concentration of the formulation in the well treating acid, of course, should be sufficient to provide protection against corrosion. The concentration of the formulation will depend on the temperature of the well, the exposure time of the tubulars to the acid solution, the type of acid, and type of metal alloy. As mentioned above, the concentration of quaternary/metal complex in the acid solution should provide a metal compound concentration of at least 0.08 wt %.

EXPERIMENTS

In order to demonstrate the effectiveness of the corrosion inhibitors of the present invention, several samples were prepared using various components.

The quaternary ammonium compounds used in the experiments were as follows:

quaternary X-quinoline-N-benzyl chloride quaternary quaternary Y-alkyl pryridine-n-benzylachloride quaternary quaternary Z-quinoline-N-chloromethylnapthyl chloride quaternary The surfactant blend was
3.0 wt parts nonylphenol (10 mols EO)
3.5 wt parts each of
polyethylene glycol (400) dioleate
polyethylene glycol (600) sesquioleate Samples A through G were prepared by mixing the compounds in the weight percentages indicated on Table I.

TABLE I

| | SAMPLES | | | | | | |
|---|---|---|---|---|---|---|---|
| | A | B | C | D | E | F | G |
| Quaternary Compound: | | | | | | | |
| X | 22.7 | 18.0 | | | | 22.7 | 22.7 |
| Y | | | 18.0 | | 18.0 | | |
| Z | | | | 18.9 | | | |
| Metal Compound: | | | | | | | |
| SbCl$_3$ | 9.0 | | | | | 9.0 | 9.0 |
| Sb$_2$O$_3$ | | 4.6 | 4.6 | 4.1 | | | |
| BiCl$_3$ | | | | | 10.0 | | |
| Solvent | | | | | | | |
| Dimethyl Formamide | 52.2 | 35.4 | 41.4 | 37.4 | 48.0 | 52.2 | 52.2 |
| Formamide | 5.3 | | | | | 5.3 | 5.3 |
| Isopropyl Alcohol | | 12.0 | | 12.6 | | | |
| Methanol | | | 6.0 | | 6.0 | | |
| Surfactant | | | | | | | |
| Surfactant blend | 5.1 | 5.0 | 5.0 | 4.5 | 5.0 | 5.1 | |
| Sorbitan Monoleate (20 EO) | | | | | | | 5.2 |
| Dispersant | | | | | | | |
| p-Aminophenol | 5.7 | | | 4.5 | | 5.7 | |
| Aniline | | 5.0 | 5.0 | | 5.0 | | |
| Mixed Picolines | | | | | | | 5.6 |
| HCl (28 wt %) | | 20.0 | 20.0 | 18.0 | 8.0 | | |

The samples is all the experiments were prepared in accordance with steps (a) through (d) described above.

Each sample was added to an aqueous acid solution. Corrosion tests using N-80 tubing steel coupons and CR 2205 (API Specification Grade Duplex containing 21.9 wt % chromium) coupons were run at conditions indicated on Table II. Table II also presents corrosion rates (pound weight loss per square foot).

As can be seen by the Table II results, the corrosion inhibitor with antimony and bismuth compounds provided excellent protection for both the steel and chromium coupons.

TABLE II

| SAMPLE | VOL. % IN ACID SOLN[1]. | ACID | TEST CONDITIONS | | | | COR. RATE (lb/ft$^2$) |
|---|---|---|---|---|---|---|---|
| | | | PRESSURE (psi) | TEMP. (°F.) | TIME HR. | CPN | |
| A | 5.2 | HCl[2] | 700 | 350 | 4 | N-80 | 0.0082 |
| A | 5.8 | Mud Acid[3] | 700 | 350 | 4 | CR2205 | 0.0034 |
| B | 6.0 | HCl | 3000 | 350 | 4 | N-80 | 0.0030 |
| B | 3.7 | HCl | 3000 | 350 | 4 | N-80 | 0.0067 |
| B | 4.1 | Mud Acid | 3000 | 350 | 4 | CR2205 | 0.0087 |
| B | 5.7 | HCl | Atm. | 180 | 24 | N-80 | 0.0050 |
| B | 3.8 | HCl | Atm. | 150 | 24 | N-80 | 0.0224 |
| B | 4.3 | Mud Acid | Atm. | 150 | 24 | N-80 | 0.0189 |
| B | 3.8 | HCl | Atm. | Room | 24 | N-80 | 0.0024 |
| C | 3.7 | HCl | 3000 | 350 | 4 | N-80 | 0.0060 |
| C | 3.8 | HCl | Atm. | 180 | 24 | N-80 | 0.0440 |
| C | 6.0 | HCl | 700 | 400 | 4 | N-80 | 0.0169 |
| C | 9.3 | HCl | 700 | 450 | 4 | N-80 | 0.0350 |
| C | 4.1 | Mud Acid | 700 | 400 | 4 | N-80 | 0.0052 |
| C | 3.8 | HCl | Atm. | 150 | 24 | N-80 | 0.0388 |
| C | 2.9 | HCl | Atm. | 150 | 24 | N-80 | 0.0023 |
| C | 4.1 | Mud Acid | 3000 | 350 | 4 | CR2205 | 0.0113 |
| C | 2.0 | Mud Acid | Atm. | 150 | 24 | N-80 | 0.0303 |
| D | 4.1 | HCl | 3000 | 350 | 4 | N-80 | 0.0155 |
| D | 2.9 | HCl | Atm. | 180 | 24 | N-80 | 0.0418 |
| D | 4.6 | Mud Acid | 3000 | 250 | 4 | CR2205 | 0.0139 |

TABLE II-continued

| SAMPLE | VOL. % IN ACID SOLN[1]. | ACID | TEST CONDITIONS ||||  COR. RATE (lb/ft$^2$) |
|---|---|---|---|---|---|---|---|
| | | | PRESSURE (psi) | TEMP. (°F.) | TIME HR. | CPN | |
| D | 3.8 | HCl | Atm. | 150 | 24 | N-80 | 0.0271 |
| D | 6.3 | Mud Acid | Atm. | 150 | 24 | N-80 | 0.0146 |
| D | 2.9 | HCl | Atm. | Room | 24 | N-80 | 0.0012 |
| E | 6.3 | Mud Acid | 3000 | 350 | 4 | CR2205 | 0.0188 |

[1] based on combined vol. % acid soln and sample
[2] 15 wt % HCl
[3] 12 wt % HCl and 3 wt % HF Additional tests were carried out on samples F and G to determine dispersability. These tests involved adding 2 ml of the blended formulation to 50 ml of 15% wt HCl. The acid was placed in a 100 ml Pyrex beaker with a teflon coated magnetic stir bar. The acid was stirred fast enough to give a vortex without drawing air into the acid. The acid corrosion inhibitor formulation was syringed into the acid as fast as possible (typically less than 1–2 seconds) and the mixture stirred an additional 15 seconds. The stability of the dispersion was checked periodically by monitoring the amount of solids at the bottom of the beaker. In some cases observations were made over a 5 day period of time. A "good" dispersant gave stability for at least 4 hours and an excellent dispersant gave a stable dispersion for 16–24 hours.

Both samples F and G, containing the dispersant, exhibited good to excellent dispersability and stability. Tests on samples without the dispersant failed—the quaternary compound/metal complex precipitated out almost immediately.

Additional tests were conducted to identify other metal salts that may be used in the corrosion inhibitor formulation of the present invention. The samples contained the quaternary compound and metal compound in the amounts indicated on Table III through VII, and 3.5 to 5 wt % of a surfactant blend, 3 wt % aniline, and 41 to 62 wt % DMF.

Five series of corrosion coupon tests were carried out. The conditions of each series was as follows:

| | TEMP. (°F.) | PRES. (psi.) | TIME (hrs.) | DATA |
|---|---|---|---|---|
| Series A | 250 | 3000 | 4 | TABLE III |
| Series B | 325 | 3000 | 2 | TABLE IV |
| Series C | 350 | 3000 | 4 | TABLE V |
| Series D | 250 | 3000 | 2 | TABLE VI |
| Series E | 325 | 3000 | 2 | TABLE VII |

TABLE III

SERIES A

| TEST NO. | QUATERNARY || METAL SALT || ACID | Coupon | CORROSION RATE lb/ft$^2$ |
|---|---|---|---|---|---|---|---|
| | Type | gms | Type | gms | Type | | |
| Control | X | 1.5 | — | — | 28% | N-80 | 0.1966 |
| 1 | X | 1.2 | CaCl$_2$ | 0.2 | 28% | N-80 | 0.0150 |
| 2 | Z | 1.2 | CaCl$_2$ | 0.2 | 28% | N-80 | 0.0145 |
| 3 | X | 1.2 | CaCl$_2$ | 0.2 | 28% | CR-2205 | 0.0205 |
| 4 | Z | 1.2 | CaCl$_2$ | 0.2 | 28% | CR-2205 | 0.0809 |
| 5 | X | 1.2 | CuI | 0.5 | 28% | CR-2205 | 0.0119 |
| 6 | X | 1.2 | CuI | 0.5 | 28% | N-80 | 0.0123 |
| 7 | Z | 1.2 | CuI | 0.5 | 28% | CR-2205 | 0.0251 |
| 8 | Z | 1.2 | CuI | 0.5 | 28% | N-80 | 0.0100 |
| 9 | X | 1.2 | Sb$_2$O$_3$ | 0.3 | 28% | CR-2205 | 0.0375 |
| 10 | X | 1.2 | Sb$_2$O$_3$ | 0.3 | 28% | N-80 | 0.0624 |
| 11 | Z | 1.2 | Sb$_2$O$_3$ | 0.3 | 28% | CR-2205 | 0.1021 |
| 12 | Z | 1.2 | Sb$_2$O$_3$ | 0.3 | 28% | N-80 | 0.0265 |
| 13 | X | 1.2 | CaCl$_2$ CuI Sb$_2$O$_3$ | 0.10 0.13 0.08 | 28% | N-80 | 0.0160 |
| 14 | X | 1.2 | CaCl$_2$ CuI Sb$_2$O$_3$ | 0.10 0.13 0.08 | 28% | CR-2205 | 0.0205 |
| 15 | Z | 1.2 | CaCl$_2$ CuI Sb$_2$O$_3$ | 0.10 0.13 0.08 | 28% | N-80 | 0.0134 |
| 16 | Z | 1.2 | CaCl$_2$ CuI Sb$_2$O$_3$ | 0.10 0.13 0.08 | 28% | CR-2205 | 0.0747 |

From the Table III data, it can be seen that the formulation containing various metal salts and quaternary compounds gave excellent protection for both N-80 steel and CR 2205 coupons in corrosive 28% HCl. The ternary metal blends (tests 13–16) provided exceptional protection vis-a-vis antimony compounds (tests 9 through 12).

The Series B tests were carried out at higher temperatures and shorter time, and generally at higher quaternary concentrations than the Series A tests. The Table IV data reveal that the formulation provided good protection for N-80 steel. The binary metal mixtures (tests 11, and 13) provided excellent protection for CR-2205 coupons in mud acid. The acids used in these tests were 15% HCl and mud acid.

TABLE IV

SERIES B

| TEST NO. | QUATERNARY Type | gms | METAL SALT Type | gms | ACID Type | Coupon | CORROSION RATE lb/ft$^2$ |
|---|---|---|---|---|---|---|---|
| 1 | X | 2.4 | SnCl$_2$ | 1.6 | 15% | N-80 | 0.0320 |
| 2 | X | 2.4 | SnCl$_2$ | 1.6 | Mud | CR-2205 | 0.6877 |
| 3 | X | 2.4 | MoCl$_5$ | 2.4 | 15% | N-80 | 0.0484 |
| 4 | X | 2.4 | MoCl$_5$ | 2.4 | Mud | CR-2205 | 0.6513 |
| 5 | Y | 1.2 | CaCl$_2$ | 0.2 | Mud | N-80 | 0.0648 |
| 6 | X | 2.4 | CaCl$_2$ | 0.5 | Mud | N-80 | 0.0312 |
| 7 | Z | 1.4 | CaCl$_2$ | 0.2 | Mud | N-80 | 0.0375 |
| 8 | X | 2.4 | CaCl$_2$ | 0.5 | 15% | N-80 | 0.0280 |
| 9 | X | 2.4 | CaCl$_2$ | 0.5 | Mud | CR-2205 | 0.5839 |
| 10 | X | 2.4 | CaCl$_2$ / CuI | 0.2 / 0.5 | 15% | N-80 | 0.0311 |
| 11 | X | 2.4 | CaCl$_2$ / CuI | 0.2 / 0.5 | Mud | CR-2205 | 0.0624 |
| 12 | X / Y | 1.2 / 0.4 | CaCl$_2$ / Sb$_2$O$_3$ | 0.2 / 0.1 | 15% | N-80 | 0.0174 |
| 13 | X / Y | 1.2 / 0.4 | CaCl$_2$ / Sb$_2$O$_3$ | 0.2 / 0.1 | Mud | CR-2205 | 0.0082 |
| 14 | X | 2.4 | MgCl$_2$ / CuI | 0.4 / 0.5 | 15% | N-80 | 0.0331 |
| 15 | X | 2.4 | AlCl$_3$ | 0.6 | 15% | N-80 | 0.027 |
| 16 | X | 2.4 | AlCl$_3$ | 0.6 | Mud | N-80 | 0.032 |
| 17 | X | 2.4 | AlCl$_3$ | 0.6 | Mud | CR-2205 | 0.596 |

The Series C tests were carried out at extreme conditions (350° F. for 4 hours). The Table V data showed generally improved results in comparison to the control (which contained the quaternary but no metal compound—Test No. 1). The preferred metal compounds (e.g. BiCl$_3$, CuI, Sb$_2$O$_3$) gave surprising results in protecting chrome steel in mud acid.

TABLE V

SERIES C

| TEST NO. | QUATERNARY Type | gms | METAL SALT Type | gms | CORROSION RATE 15% HCl | Mud Acid | Coupon |
|---|---|---|---|---|---|---|---|
| 1 | X | 1.5 | — | — | 0.7235 | 0.6840 | N-80 |
| 2 | X | 1.2 | AlCl$_3$ | 0.3 | 0.1329 | 0.1704 | N-80 |
| 3 | X | 1.2 | AlCl$_3$ | 0.6 | 0.1434 | 0.2026 | N-80 |
| 4 | Y | 1.2 | BiCl$_3$ | 0.7 | — | 0.0188 | CR-2205 |
| 5 | Y | 2.0 | BiCl$_3$ | 1.1 | — | 0.0467 | CR-2205 |
| 6 | X | 1.2 | CaCl$_2$ | 0.2 | 0.1355 | 0.1355 | N-80 |
| 7 | X | 2.0 | CuI | 0.8 | 0.1068 | — | N-80 |
| 8 | X | 2.0 | CuI | 0.8 | — | 0.2459 | CR-2205 |
| 9 | Z | 2.0 | CuI | 0.8 | 0.0568 | — | N-80 |
| 10 | Z | 2.0 | CuI | 0.8 | — | 0.1446 | CR-2205 |
| 11 | X | 1.3 | CuI | 1.1 | 0.0982 | — | N-80 |
| 12 | X | 1.3 | CuI | 1.1 | — | 0.5650 | CR-2205 |
| 13 | X | 1.3 | Sb$_2$O$_3$ | 0.3 | — | 0.0096 | CR-2205 |
| 14 | X | 1.3 | Sb$_2$O$_3$ | 0.3 | 0.0030 | — | N-80 |
| 15 | Z | 1.5 | Sb$_2$O$_3$ | 0.3 | 0.0091 | — | N-80 |
| 16 | Z | 1.5 | Sb$_2$O$_3$ | 0.3 | — | 0.0129 | CR-2205 |
| 17 | Y | 1.2 | Sb$_2$O$_3$ | 0.3 | 0.0064 | — | N-80 |
| 18 | Y | 1.2 | Sb$_2$O$_3$ | 0.3 | — | 0.0131 | CR-2205 |
| 19 | X | 1.3 | SnCl$_2$ | 0.9 | — | 0.5342 | CR-2205 |
| 20 | X | 1.2 | SnCl$_2$ | 0.4 | — | 0.6734 | CR-2205 |
| 21 | X | 1.3 | SnCl$_2$ | 0.9 | 0.3455 | — | N-80 |
| 22 | X | 1.2 | SnCl$_2$ | 0.4 | 0.1938 | — | N-80 |
| 23 | X | 1.2 | ZrOCl$_2$ | 0.4 | 0.1512 | 0.1963 | N-80 |
| 24 | X | 1.2 | MgCl$_2$ | 0.5 | 0.1439 | 0.1856 | N-80 |
| 25 | X | 1.3 | MoCl$_5$ | 1.3 | 0.3478 | — | N-80 |
| 26 | X | 1.2 | MoCl$_5$ | 0.6 | 0.1623 | — | N-80 |
| 27 | X | 1.3 | MoCl$_5$ | 0.6 | 0.6628 | — | CR-2205 |
| 28 | X | 1.2 | MoCl$_5$ | 0.6 | — | 0.7470 | CR-2205 |
| 29 | X | 1.2 | ZnCl$_2$ | 0.3 | 0.2162 | — | N-80 |

Series D tests were conducted to show the effects of the quat/metal complex on corrosion in 28% HCl. The formulation of Tests 1, 2, and 3 did not include the metal salts; whereas the formulation of the other tests included metal results. All tests with the quat/metal complex exhibited dramatic improvement in corrosion protection.

TABLE VI

SERIES D

| TEST NO. | QUATERNARY Type | gms | METAL SALT Type | gms | Coupon | CORROSION RATE lb/ft$^2$ |
|---|---|---|---|---|---|---|
| 1 | Y | 1.9 | — | — | N-80 | 0.2527 |
| 2 | X | 1.5 | — | — | N-80 | 0.0746 |
| 3 | Z | 1.5 | — | — | N-80 | 0.0539 |
| 4 | X | 1.2 | CaCl$_2$ | 0.2 | N-80 | 0.0103 |
| 5 | Y | 1.2 | CaCl$_2$ | 0.2 | N-80 | 0.0262 |
| 6 | Z | 1.2 | CaCl$_2$ | 0.2 | N-80 | 0.0107 |

TABLE VI-continued

SERIES D

| TEST NO. | QUATERNARY Type | gms | METAL SALT Type | gms | Coupon | CORROSION RATE lb/ft² |
|---|---|---|---|---|---|---|
| 7 | Z | 1.2 | CuI | 0.5 | N-80 | 0.0082 |
| 8 | X | 1.2 | CuI | 0.5 | N-80 | 0.0094 |
| 9 | X | 1.2 | $Sb_2O_3$ | 0.3 | N-80 | 0.0245 |
| 10 | Y | 1.2 | $Sb_2O_3$ | 0.3 | N-80 | 0.0231 |
| 11 | Z | 1.2 | $Sb_2O_3$ | 0.3 | N-80 | 0.0318 |
| 12 | Z | 1.0 | $CaCl_2$ | 0.2 | N-80 | 0.0169 |
|  | Y | 0.2 | $Sb_2O_3$ | 0.05 |  |  |
| 13 | Z | 0.8 | $CaCl_2$ | 0.16 | N-80 | 0.0200 |
|  | Y | 0.4 | $Sb_2O_3$ | 0.10 |  |  |
| 14 | Z | 0.6 | $CaCl_2$ | 0.12 | N-80 | 0.0229 |
|  | Y | 0.6 | $Sb_2O_3$ | 0.15 |  |  |
| 15 | Z | 1.2 | $CaCl_2$ | 0.16 | N-80 | 0.0189 |
|  |  |  | $Sb_2O_3$ | 0.10 |  |  |
| 16 | Z | 1.2 | $CaCl_2$ | 0.20 | N-80 | 0.0105 |
|  |  |  | CuI | 0.08 |  |  |
| 17 | Z | 1.2 | $CaCl_2$ | 0.16 | N-80 | 0.0103 |
|  |  |  | CuI | 0.16 |  |  |

The Series E tests (Table VII) demonstrate the effectiveness of the binary metal salt mixtures. The HCl acid was 15% HCl and the mud acid was a mixture of 12% HCL and 3% HF. The metal mixtures provided surprisingly good protection for CR 2205 in mud acid environment.

The binary and ternary metal salt mixtures are particularly applicable in protecting chrome steel in mud acid environments. Chrome steel alloys as used herein includes alloys containing more than trace amounts of CR, specifically 8 wt % or more Cr.

TABLE VII

SERIES E

| TEST NO. | QUATERNARY Type | gms | METAL SALT Type | gms | ACID Type | Coupon | CORROSION RATE lb/ft² |
|---|---|---|---|---|---|---|---|
| 1 | X | 2.4 | $MgCl_2$ | 0.4 | Mud | CR-2205 | 0.0761 |
|  |  |  | CuI | 0.5 |  |  |  |
| 2 | X | 1.2 | $SnCl_2$ | 0.8 | Mud | CR-2205 | 0.0213 |
|  | Y | 0.4 | $Sb_2O_3$ | 0.1 |  |  |  |
| 3 | X | 1.2 | $MoCl_5$ | 1.2 | HCl | N-80 | 0.0328 |
|  | Y | 0.4 | $Sb_2O_3$ | 0.1 |  |  |  |
| 4 | X | 1.2 | $MoCl_5$ | 1.2 | Mud | CR-2205 | 0.0950 |
|  | Y | 0.4 | $Sb_2O_3$ | 0.1 |  |  |  |
| 5 | X | 1.2 | $AlCl_3$ | 0.3 | HCl | N-80 | 0.0334 |
|  | Y | 0.4 | $Sb_2O_3$ | 0.1 |  |  |  |
| 6 | X | 1.2 | $AlCl_3$ | 0.3 | Mud | CR-2205 | 0.0042 |
|  | Y | 0.4 | $Sb_2O_3$ | 0.1 |  |  |  |
| 7 | X | 0.4 | CuI | 0.16 | HCl | N-80 | 0.0059 |
|  | Y | 0.8 | $Sb_2O_3$ | 0.20 |  |  |  |
| 8 | X | 0.4 | CuI | 0.16 | Mud | CR-2205 | 0.0143 |
|  | Y | 0.8 | $Sb_2O_3$ | 0.20 |  |  |  |
| 9 | Z | 0.7 | $CaCl_2$ | 0.16 | HCl | N-80 | 0.0034 |
|  | Y | 0.4 | $Sb_2O_3$ | 0.10 |  |  |  |
| 10 | Z | 0.9 | $CaCl_2$ | 0.16 | HCl | N-80 | 0.0137 |
|  | Y | 0.4 | $Sb_2O_3$ | 0.10 |  |  |  |
| 11 | Y | 1.2 | $CaCl_2$ | 0.16 | HCl | N-80 | 0.0478 |
|  |  |  | $Sb_2O_3$ | 0.10 |  |  |  |
| 12 | Y | 1.2 | $CaCl_2$ | 0.16 | Mud | CR-2205 | 0.0450 |
|  |  |  | $Sb_2O_3$ | 0.10 |  |  |  |
| 13 | X | 0.8 | $CaCl_2$ | 0.16 | HCl | N-80 | 0.0393 |
|  | Y | 0.4 | $Sb_2O_3$ | 0.10 |  |  |  |
| 14 | X | 0.8 | $CaCl_2$ | 0.16 | Mud | CR-2205 | 0.0154 |
|  | Y | 0.4 | $Sb_2O_3$ | 0.10 |  |  |  |
| 15 | X | 0.8 | $ZnCl_2$ | 0.2 | HCl | N-80 | 0.0384 |
|  | Y | 0.4 | $Sb_2O_3$ | 0.1 |  |  |  |
| 16 | X | 0.8 | $ZrOCl_2$ | 0.2 | HCl | N-80 | 0.0477 |
|  | Y | 0.4 | $Sb_2O_3$ | 0.1 |  |  |  |
| 17[1] | X | 1.2 | $CaCl_3$ | 0.3 | HCl | CR-2205 | 0.0245 |
|  | Y | 1.2 | $Sb_2O_3$ | 0.3 |  |  |  |

[1]performed at 450° F.

Solubility tests were conducted to compare the solubilities of various solvents for dissolving metal - quaternary complex. The samples were prepared as described previously.

The metal quaternary complex was found to have the following solubilities in the solvent tested:

(a) insoluble in acetone, isopropyl alcohol (IPA), toluene, xylene, Aromatic 150, 15–28% HCL, and water.

(b) somewhat soluble in formamide (c) very soluble in DMF (d) soluble in DMF/IPA, methyl alcohol/DMF, DMF/ formamide, DMF/formamide/methyl alcohol blends.

Summarizing the experimented data, the corrosion inhibitor formulation is characterized by (1) effective corrosion protection for ferrous metals and chromium steel in HCl solutions and mud acid solutions.

(2) good stability, (3) good dispersability in the well treating acid, and (4) Low toxicity vis-a-vis acetylenic compounds.

While the present invention has been described with specific reference to well acidizing, it will be appreciated by those skilled in the art that it may also be used in any aqueous well treating operation. The present invention expressly embraces a method for treating a well with an aqueous liquid containing a quaternary ammonium/metal compound complex wherein the metal compound comprises (a) a compound of Ca, Sb, $Cu^+$, or Bi and (b) a metal compound listed under the section headed "Metal Compounds", and wherein (a) and (b) are different.

What is claimed is:

1. A corrosion inhibitor formulation capable of dispersion in aqueous well treating acids which comprises:
   (a) from 1 to 25 wt % of a metal salt wherein the metal thereof is selected from the group consisting of $Cu^+$, Sn, Zn, and a Group IIA metal having an atomic number from 12 to 56, a Group IVA metal having an atomic number of 22 or 40, a Group IIIB metal having an atomic number from 13 to 49, a Group VIA metal having an atomic number from 24 to 74, and a Group VB metal having an atomic number from 33 to 83; and mixtures thereof;
   (b) from 3 to 50 wt % of a quaternary ammonium compound capable of forming a complex with said metal salt;
   (c) sufficient amount of a highly polar aprotic solvent to dissolve the metal salt and the quaternary ammonium compounds, the concentration of said polar aprotic solvent being between 20 to 90 wt %; and
   (d) from 1 to 15% of an organic amine dispersant for dispersing the complex of the quaternary ammonium compound and the metal salt in the sell treating acid, said wt % being based on the formulation.

2. The formulation of claim 1 and further comprising a nonionic surfactant having an HLB No. of from 8 to 18.

3. The formulation of claim 1 wherein the metal salt is a metal halide.

4. The formulation of claim 1 wherein the solvent is selected from the group consisting of dimethyl formamides, DMSO, DMA, pyrrolidone, and sulfolane.

5. The formulation of claim 4 wherein the solvent is dialkyl formamide wherein each alkyl group contains from 1 to 3 carbon atoms.

6. The formulation of claim 1 wherein the metal is selected from the group consisting of Sb, Bi, Ca, $Cu^+$, Al, Sn, Zr, Mg, Ba, Mo, Zn, Sr, and mixtures thereof.

7. The formulation of claim 1 wherein the dispersant is selected from the group consisting of aniline, aminophenol, chloroaniline, toluidine, diphenyl amine, picoline, alkyl pyridine, and n-alkyl amine.

8. The formulation of claim 1 wherein the quaternary ammonium compound is selected from the group consisting of alkyl pyridine-N-benzyl chloride quaternary, quinoline-N-benzyl chloride quaternary, and quinoline-N-(chlorobenzyl chloride) quaternary, quinoline-N-(a-chloromethylnapthyl) quaternary.

9. The formulation of claim 1 wherein the metal is selected from the group consisting of Sb, Bi, Ca, $Cu^+$, and mixtures thereof 10. The formulation of claim 3 wherein the metal halide is $SbCl_3$.

11. The formulation of claim 9 wherein the metal salt is a mixture of Sb and Ca, or Sb and $Cu^+$, or Ca and $Cu^+$ salts.

12. The formulation of claim 11 wherein the weight ratio of each metal compound ranges from 1:10 to 10:1.

13. The formulation of claim 9 wherein the metal salt is a mixture of Sb, $Cu^+$, and Ca salts.

14. The formulation of claim 13 wherein each metal salt of the mixture represents at least 10 wt % of the mixture.

15. The formulation of claim 1 wherein the metal salt concentration is from 2 to 20 wt %, the quaternary ammonium compound concentration is from 12 to 50 wt %, the dispersant concentration is from 1 to 10 wt %.

16. A method of acidizing a subterranean formation by injecting a well treating acid solution down pipe into the well, which comprises:
   (a) preparing the corrosion inhibitor formulation of claim 1;
   (b) dispersing the formulation in the well treating acid solution to provide the solution with at least 0.08 wt % of the metal salt based on the combined weight of the well treating acid and formulation, and
   (c) injecting the well treating acid solution containing the corrosion inhibitor formulation through the pipe into the formation.

17. The method of claim 16 wherein the metal salt is a mixture of two salts selected from the group consisting of Ca, $Cu^+$, Bi, Sb salts.

18. The method of claim 16 wherein the pipe is composed of chromimium steel, and the acid solution is mud acid, and the metal salt is selected from the group consisting of Sb, As, Al, Bi, Ca salts, and mixtures thereof.

19. The method of claim 16 wherein the acid solution is selected from the group consisting of 3% to 28% HCl and mixtures of HCl and HF wherein acid concentration in the aqueous solution ranges from 7% to 18%.

20. An aqueous well treating acid composition comprising
   (a) an aqueous solution of selected from the group consisting of HCl, HF, acetic acid, formic acid solutions and mixtures thereof; and
   (b) a corrosion inhibitor formulation as defined in claim 1, the concentration of the corrosion inhibitor formulation being sufficient to provide the aqueous solution with at least 0.08 wt % of the metal compound based on the combined weight of solution and formulation.

* * * * *